(12) United States Patent
Gupta et al.

(10) Patent No.: US 10,839,547 B2
(45) Date of Patent: Nov. 17, 2020

(54) CAMERA POSE DETERMINATION AND TRACKING

(71) Applicant: Samsung Electronics Co., Ltd., Suwon-si (KR)

(72) Inventors: Ankur Gupta, Santa Clara, CA (US); Michael Sapienza, Mountain View, CA (US); Fannie Fontanel, Sunnyvale, CA (US); Abhijit Z. Bendale, Sunnyvale, CA (US); Pranav Mistry, Campbell, CA (US)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 254 days.

(21) Appl. No.: 15/962,757

(22) Filed: Apr. 25, 2018

(65) Prior Publication Data

US 2019/0096081 A1    Mar. 28, 2019

Related U.S. Application Data

(60) Provisional application No. 62/564,957, filed on Sep. 28, 2017.

(51) Int. Cl.
*G06T 7/70* (2017.01)
*G06T 5/00* (2006.01)

(52) U.S. Cl.
CPC ............... *G06T 7/70* (2017.01); *G06T 5/00* (2013.01); *G06T 2207/10004* (2013.01); *G06T 2207/10024* (2013.01); *G06T 2207/10028* (2013.01); *G06T 2207/30244* (2013.01)

(58) Field of Classification Search
None
See application file for complete search history.

(56) References Cited

U.S. PATENT DOCUMENTS

| | | |
|---|---|---|
| 8,542,250 B2 | 9/2013 | Beasley et al. |
| 9,131,220 B2 | 9/2015 | Givon |
| 9,370,302 B2 | 6/2016 | Krueger |
| 9,761,054 B2 | 9/2017 | Bronder et al. |
| 10,529,074 B2 | 1/2020 | Fontanel et al. |

(Continued)

FOREIGN PATENT DOCUMENTS

JP    2002-071313 A    3/2002

OTHER PUBLICATIONS

Garrido-Jurado, S. et al., "Automatic generation and detection of highly reliable fiducial markers under occlusion," Pattern Recognition, Jun. 1, 2014, vol. 47, No. 6, pp. 2280-2292.

(Continued)

*Primary Examiner* — Kevin Ky
(74) *Attorney, Agent, or Firm* — Cuenot, Forsythe & Kim, LLC (57) ABSTRACT

A system for determining and tracking camera pose includes a dynamic vision sensor (DVS) configured to generate a current DVS image, an inertial measurement unit (IMU) configured to generate inertial data, and a memory. The memory is configured to store a 3-dimensional (3D) map of a known 3D environment. The system may also include a processor coupled to the memory. The processor is configured to initiate operations including determining a current camera pose for the DVS based on the current DVS image, the inertial data, the 3D map, and a prior camera pose.

24 Claims, 4 Drawing Sheets

(56) References Cited

U.S. PATENT DOCUMENTS

| | | |
|---|---|---|
| 2006/0293810 A1 | 12/2006 | Nakamoto |
| 2009/0295791 A1 | 12/2009 | Aguera y Arcas et al. |
| 2013/0321122 A1* | 12/2013 | Lee ................. G01S 5/0009 340/3.1 |
| 2014/0369557 A1 | 12/2014 | Kayombya et al. |
| 2015/0094142 A1 | 4/2015 | Stafford |
| 2015/0279083 A1 | 10/2015 | Pradeep et al. |
| 2016/0105661 A1 | 4/2016 | Givon |
| 2016/0140729 A1 | 5/2016 | Soatto et al. |
| 2016/0267662 A1 | 9/2016 | Sugden |
| 2016/0320951 A1 | 11/2016 | Ernst et al. |
| 2017/0032536 A1 | 2/2017 | Lee et al. |
| 2017/0102772 A1 | 4/2017 | Hesch et al. |
| 2017/0124693 A1 | 5/2017 | Ramalingam et al. |
| 2017/0132794 A1 | 5/2017 | Lee et al. |
| 2017/0213105 A1 | 7/2017 | Ji et al. |
| 2018/0018805 A1* | 1/2018 | Kutliroff ................. G06T 7/60 |
| 2018/0158200 A1* | 6/2018 | Metzler ................. G06T 7/38 |
| 2018/0275242 A1 | 9/2018 | Peri |
| 2019/0096068 A1 | 3/2019 | Fontanel et al. |

OTHER PUBLICATIONS

Hofstetter, M., "Temporal Pattern-Based Active Marker Identification and Tracking Using a Dynamic Vision Sensor," Doctoral dissertation, Master thesis, Institue of Neuroinformatics, ETH Zurich, 107 pg.

"OpenCV: Detection of ArUco Markers," [online] OpenCV.Org, Aug. 4, 2017 [retrieved Jan. 12, 2018], retrieved from the Internet: <https://docs.opencv.org/3.1.0/d5/dae/tutorial_aruco_detection.html>, 12 pg.

Censi, A. et al., "Low-latency localization by Active LED Markers tracking using a Dynamic Vision Sensor," In IEEE/RSJ Int'l Conf. on Intelligent Robots and Systems (IROS), Nov. 3, 2013, pp. 891-898).

Kim, E., "Event-based Camera Calibration," [online] YouTube, Apr. 14, 2016 [retrieved Apr. 25, 2018], retrieved from the Internet: https://www.youtube.com/watch?v=OK_m6Oobnt>, 7 pg.

Lepetit, V. et al., "EPnP: An Accurate O(n) Solution to the PnP Problem," Int'l. Journal of Computer Vision, 2009, vol. 81, No. 2, pp. 155-166.

Delbruck, T., et al., "Integration of dynamic vision sensor with inertial measurement unit for electronically stabilized event-based vision," In 2014 IEEE Int'l Sym. on Circuits and Systems (ISCAS), 2014, pp. 2636-2639, Abstract only, retrieved from the Internet: <https://ieeexplore.ieee.org/document/6865714/>, 2 pg.

Gallego, G. et al., "Event-based Camera P ose Tracking U sing a Generative Event Model," arXiv preprint arXiv:1510.01972, Oct. 7, 2015, 7 pg.

Faessler, M. et al., "A Monocular Pose Estimation System Based on Infrared LEDs," In 2014 IEEE Int'l. Conf. on Robotics and Automation (ICRA),May 31, 2014, pp. 907-913.

WIPO App PCT/KR2018/011400, Written Opinion, dated Jan. 2, 2019, 5 pg.

WIPO App PCT/KR2018/011400, Int'l. Search Report, dated Jan. 2, 2019, 4 pg.

WIPO Appln. PCT/KR2018/011545, Written Opinion, dated Jan. 4, 2019, 4 pg.

WIPO App PCT/KR2018/011545, Int'l. Search Report, dated Jan. 2, 2019, 3 pg.

EPO Appln. No. 18863597, Supplementary European Search Report, dated Apr. 16, 2020, 12 pg.

EP Appln. EP18863597.3, Extended European Search Report, dated Jul. 10, 2020, 14 pg.

Li-Chee-Ming, J.F., "Map-Based Localization for Unmanned Aerial Vehicle Navigation," Dissertation Submitted to the Facuity of Graduate Studies in Partial Fulfillment of the Requirements for the Degree of Doctor of Philosophy Graduate Program in Earth and Space Science, Jul. 1, 2017, York University, 206 pg.

* cited by examiner

CAMERA POSE DETERMINATION AND TRACKING

CROSS-REFERENCE TO RELATED APPLICATIONS

This application claims the benefit of U.S. Provisional Patent Application No. 62/564,957 filed on Sep. 28, 2017, which is fully incorporated herein by reference.

TECHNICAL FIELD

This disclosure relates to determining and tracking camera pose within known 3-dimensional (3D) environments.

BACKGROUND

A variety of different technologies rely upon accurate determination of position and orientation of a camera, referred to as the "pose" of the camera or "camera pose." Robotics and computer vision systems, e.g., augmented reality and/or virtual reality systems, rely upon camera pose extensively. The ability to accurately determine and track camera pose allows a system to determine the position and orientation of 3-dimensional (3D) virtual objects with respect to the camera.

Conventional systems for determining and tracking camera pose often rely upon photographic cameras and depth sensors. Photographic cameras are also referred to as "RGB" (Red, Green, Blue) cameras. Many low power devices such as mobile phones, drones, and certain wearable devices like smart glasses operate primarily on battery power making power consumption an important consideration. Photographic cameras and depth sensors consume a significant amount of power making the combination of these sensors unsuitable for use in low power devices.

Performance is another consideration. For a system to be responsive and user-friendly, the system must be able to accurately determine and track camera pose, and do so with relatively low-latency. Technologies such as Global Positioning System (GPS) receivers are unable to provide sufficient accuracy for determining camera pose. Conventional low-cost GPS receivers, for example, are usually accurate only within several meters making such GPS receivers unsuitable for computer vision and/or robotics applications.

SUMMARY

In one or more embodiments, a system includes a dynamic vision sensor (DVS) configured to generate a DVS image, an inertial measurement unit (IMU) configured to generate inertial data, and a memory. The memory is configured to store a 3-dimensional (3D) map of a known 3D environment. The system may also include a processor coupled to the memory. The processor is configured to initiate operations including determining a current camera pose for the DVS based on the current DVS image, the inertial data, the 3D map, and a prior camera pose.

In one or more embodiments, a method includes generating, using a DVS, a current DVS image, generating, using an IMU, inertial data, and retrieving, using a processor, at least a portion of a 3D map of a known 3D environment from a memory. The method may include determining, using the processor, a current camera pose for the DVS based on the current DVS image, the inertial data, the 3D map, and a prior camera pose.

In one or more embodiments, a computer program product includes a computer readable storage medium having program code stored thereon. The program code is executable by a processor to perform operations. The operations may include generating a current DVS image, generating inertial data, and retrieving at least a portion of a 3D map of a known 3D environment from a memory. The operations may include determining a current camera pose for the DVS based on the current DVS image, the inertial data, the 3D map, and a prior camera pose.

This Summary section is provided merely to introduce certain concepts and not to identify any key or essential features of the claimed subject matter. Many other features and embodiments of the invention will be apparent from the accompanying drawings and from the following detailed description.

BRIEF DESCRIPTION OF THE DRAWINGS

The accompanying drawings show one or more embodiments; however, the accompanying drawings should not be taken to limit the invention to only the embodiments shown. Various aspects and advantages will become apparent upon review of the following detailed description and upon reference to the drawings.

DETAILED DESCRIPTION

While the disclosure concludes with claims defining novel features, it is believed that the various features described herein will be better understood from a consideration of the description in conjunction with the drawings. The process (es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to determining and tracking camera pose. In accordance with the inventive arrangements described within this disclosure, a system is capable of accurately determining and/or tracking camera pose within a known 3-dimensional (3D) environment. The system is capable of tracking camera pose over time and doing so in an accurate, power efficient, and computationally efficient manner. The system is also capable of operating with reduced latency compared to other conventional systems.

In one or more embodiments, the system utilizes multiple sensors to determine and/or track camera pose. In particular embodiments, the sensors are incorporated into a multi-sensor assembly. Examples of the sensors may include, but are not limited to, a Dynamic Vision Sensor (DVS), a photographic or Red, Green, Blue (RGB) sensor, an Inertial Measurement Unit (IMU), and a Global Positioning System (GPS) receiver. A multi-sensor assembly including these sensors may be implemented inexpensively and used with the system.

The system is capable of using the RGB sensor in a limited capacity. For example, the system is capable of using the RGB sensor during a startup and/or recovery process that determines an initial camera pose for the system. Once an initial camera pose is determined, rather than continue to use the RGB sensor for tracking purposes, the system is capable of deactivating the RGB sensor. With the RGB sensor deactivated, the system is capable of tracking camera pose using the DVS. In general, a DVS is capable of operating at higher frequencies than an RGB sensor. This allows the system to track camera pose with reduced latency to provide an improved experience to the user particularly in applications such as virtual reality and augmented reality. Use of the DVS facilitates low-latency camera tracking without the need for more expensive high-frame rate RGB sensors that consume significant amounts of power.

In one or more embodiments, the system is capable of using a 3D map and a re-localization model for the known 3D environment. For purposes of discussion, a known 3D environment may be referred to herein from time to time as a "scene." By using the 3D map and the re-localization model, the system is capable of determining camera pose at startup of the system and/or when recovering from an error condition with minimal delay and without user involvement. Further, the system is capable of using such data structures to reduce latency while tracking camera pose.

Further aspects of the inventive arrangements are described below in greater detail with reference to the figures. For purposes of simplicity and clarity of illustration, elements shown in the figures are not necessarily drawn to scale. For example, the dimensions of some of the elements may be exaggerated relative to other elements for clarity. Further, where considered appropriate, reference numbers are repeated among the figures to indicate corresponding, analogous, or like features.

Figure 1:
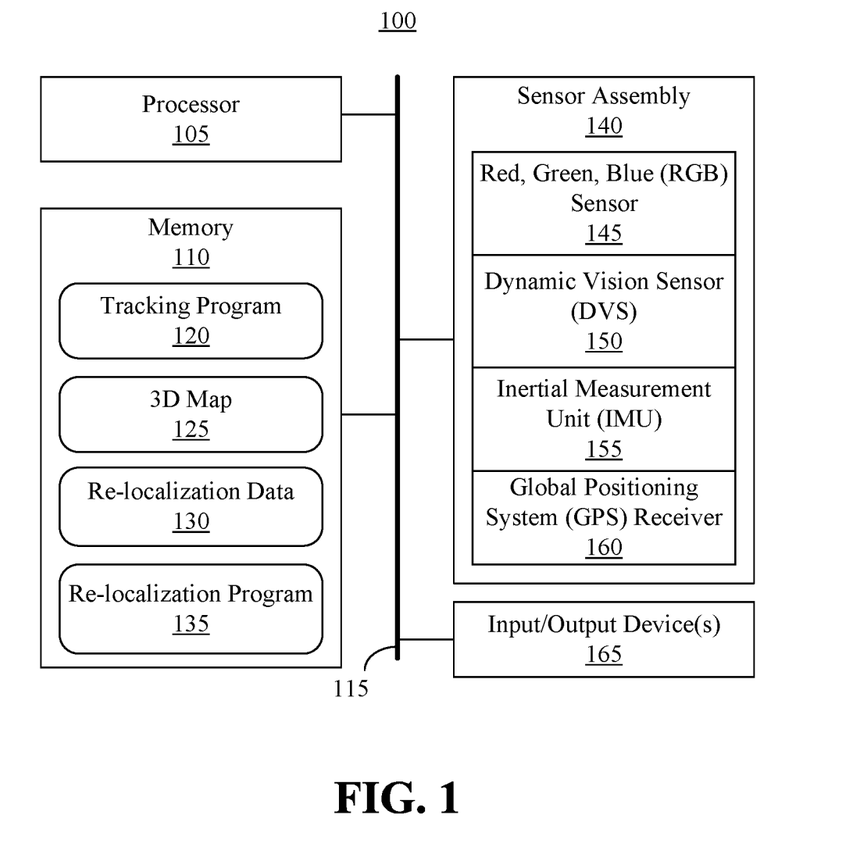
FIG. 1 illustrates an example system for use with one or more embodiments described herein.

FIG. 1 illustrates an example system 100 for use with one or more embodiments described herein. System 100 is an example of computer hardware that may be used to implement a computer, a server, a portable computer such as a laptop or a tablet computer, or other data processing system. In particular embodiments, system 100 may be used to implement a peripheral device or a portion of a peripheral device that may be used with another device or system communicatively linked thereto. A system or device implemented using computer hardware is capable of performing the various operations described herein relating to determining camera pose and/or tracking camera pose within a known 3D environment.

In the example of FIG. 1, system 100 includes at least one processor 105. Processor 105 is coupled to memory 110 through interface circuitry 115. System 100 is capable of storing computer readable instructions (also referred to as "program code") within memory 110. Memory 110 is an example of computer readable storage media. Processor 105 is capable of executing the program code accessed from memory 110 via interface circuitry 115.

Memory 110 may include one or more physical memory devices such as, for example, a local memory and a bulk storage device. Local memory refers to non-persistent memory device(s) generally used during actual execution of program code. Examples of local memory include random access memory (RAM) and/or any of the various types of RAM that are suitable for use by a processor during execution of program code (e.g., dynamic RAM or "DRAM" or static RAM or "SRAM"). A bulk storage device refers to a persistent data storage device. Examples of bulk storage devices include, but are not limited to, a hard disk drive (HDD), a solid-state drive (SSD), flash memory, a read-only memory (ROM), an erasable programmable read-only memory (EPROM), electrically erasable programmable read-only memory (EEPROM), or other suitable memory. System 100 may also include one or more cache memories (not shown) that provide temporary storage of at least some program code in order to reduce the number of times program code must be retrieved from a bulk storage device during execution.

Memory 110 is capable of storing program code and/or data. For example, memory 110 is capable of storing various routines, programs, objects, components, logic, other suitable instructions, and/or other data structures. For purposes of illustration, memory 110 stores a tracking program 120, a 3D map 125, re-localization data 130, and a re-localization program 135. Within this disclosure, re-localization data 130 and re-localization program 135 are also referred to collectively as a "re-localization model" from time-to-time. Memory 110 may also store an operating system (not shown) that is executable by processor 105 and that facilitates execution of program code and the storage of data.

System 100 is capable executing re-localization program 135 and using re-localization data 130 and 3D map 125 to determine an initial camera pose. System 100 is capable of executing tracking program 120 and using 3D map 125 for purposes of tracking camera pose within a known 3D environment given the previously determined initial camera pose (or a prior camera pose). It should be appreciated that any data used, generated, and/or operated upon by system 100 (e.g., processor 105) are functional data structures that impart functionality when employed as part of the system. Tracking program 120, 3D map 125, re-localization data 130, and re-localization program 135 are described in greater detail below.

Examples of interface circuitry 115 include, but are not limited to, a system bus and an input/output (I/O) bus. Interface circuitry 115 may be implemented using any of a variety of bus architectures. Examples of bus architectures may include, but are not limited to, Enhanced Industry Standard Architecture (EISA) bus, Accelerated Graphics Port (AGP), Video Electronics Standards Association (VESA) local bus, Universal Serial Bus (USB), and Peripheral Component Interconnect Express (PCIe) bus.

System 100 may include one or more sensors. In one or more embodiments, the sensors may be included within a sensor assembly 140. Sensor assembly 140 may be a multi-sensor assembly that includes more than one sensor. In the example of FIG. 1, sensor assembly 140 includes an RGB sensor 145, a DVS 150, an IMU 155, and optionally a GPS receiver 160.

In one or more embodiments, sensor assembly 140 may be implemented as an integrated unit. For example, each of RGB sensor 145, DVS 150, IMU 155, and optionally GPS receiver 160 may be mounted on a single circuit board and implemented within a same physical housing. In another example, the noted sensors may be on two or more different circuit boards and located within a same physical housing. For example, sensor assembly may be implemented as a peripheral device that may be coupled to another device such as a mobile phone or a wearable device such as smart glasses, a virtual reality headset, and an augmented reality headset or glasses. In other embodiments, sensor assembly 140 may be integrated into such devices. For example, sensor assembly 140 may be integrated into an automobile or other vehicle.

Sensor assembly 140 may be coupled to interface circuitry 115 directly or through an intervening I/O controller. In one or more other embodiments, RGB sensor 145, DVS 150, IMU 155, and optionally GPS receiver 160 are implemented as individual sensors that are individually coupled to interface circuitry 115 directly or through respective I/O controllers. The example sensor configurations and sensor assembly configurations described herein are provided for purposes of illustration and are not intended as limitations.

RGB sensor 145 is capable of generating RGB images. The RGB images are 2D images and are sometimes referred to as RGB frames. As generally known, pixels of an RGB image generated by RGB sensor 145 indicate or specify light intensity. DVS 150 is capable of detecting changes in light intensity. DVS 150, for example, detects changes in light intensity that are larger than a predetermined or threshold amount. For each detected change in light intensity that exceeds the threshold amount, DVS 150 is capable of generating an event. DVS 150, for example, outputs the location and timestamp for each such event. Events, for example, may correspond to pixels of DVS 150 based upon the location, where each event effectively describes a change in perceived brightness of a pixel. Further, the event may be positive or negative depending upon the direction of the change in light intensity. In particular embodiments, DVS 150 is capable of outputting the events as an event stream.

In one or more embodiments, processor 105 is capable of processing the events output from DVS 150 to generate a DVS image. For example, DVS 150 may output a stream of events as described over time. For given time spans, processor 105 may compose the events from each respective time span into corresponding DVS images. Thus, a DVS image includes the events output from DVS 150 for a given time span. Processor 105 is capable of assigning a single timestamp to each DVS image. Since DVS 150 typically generates events on scene edges, the resulting DVS image looks similar to an edge image generated by running an edge detector on an RGB image.

In one or more other embodiments, DVS 150 may be implemented to include processing circuitry. The processing circuitry may be configured to generate DVS images from the events as described. In that case, DVS 150 is capable of directly outputting DVS images. For purposes of discussion within this disclosure, DVS 150 is said to output DVS images, whether such DVS images are output directly from DVS 150 or are generated with the assistance of another processor such as processor 105.

In one or more embodiments, DVS 150 may be implemented using a single chip or integrated circuit. In one or more other embodiments, DVS 150 may be implemented as a stereo DVS, e.g., where two such DVS units are included. A stereo DVS is capable of providing increased robustness to the image processing described herein. By using stereo DVS, for example, the system is able to incorporate a depth comparison term in the optimizations described herein in connection with FIG. 5.

In operation, DVS 150 consumes significantly less power than RGB sensor 145. In some cases, for example, DVS 150 may consume approximately 14% of the power used by RGB sensor 145. DVS 150 is also capable of operating at a higher frequency, or frame rate, than RGB sensor 145. RGB sensor 145 has an update rate of approximately 33 milliseconds, whereas DVS 150 has an update rate in the microsecond range. DVS 150 further has a higher dynamic range than RGB sensor 145 thereby allowing DVS 150 to operate in both bright and dark 3D environments.

RGB sensor 145 and DVS 150 may be mounted within system 100 and/or within sensor assembly 140 to have overlapping fields of view. The field of view of RGB sensor 145 and the field of view of DVS 150, for example, may be the same or substantially the same so that both are capable of generating image data for the known 3D environment. In some cases, RGB sensor 145 and DVS sensor 150 are capable of operating independently of one another. In other cases, RGB sensor 145 and DVS sensor 150 may operate in coordination with one another so that an RGB frame generated by RGB sensor 145 is generated at or about the same time that a DVS frame is generated by DVS sensor 150. For example, RGB sensor 145 an DVS 150 may operate in a synchronized manner in some cases. Operation of sensors within sensor assembly 140 may be controlled by processor 105 in executing program code stored in memory 110.

IMU 155 is an electronic device that is capable of measuring linear and angular motion. IMU 155 may include one or more accelerometers and gyroscopes to measure linear and angular motion. In particular embodiments, IMU 155 is capable of measuring magnetic field. In such embodiments, IMU 155 may also include one or more magnetometers. IMU 155 outputs the measurements described as inertial data. GPS receiver 160 is capable of generating GPS data specifying a 3D location of GPS receiver 160. The GPS data may specify the 3D location in terms of latitude, longitude, and height or relative height. GPS receiver 160 may be implemented as a low-power unit that may be used for coarse localization.

In one or more embodiments, processor 105 is capable of controlling the frame rate of DVS 150. For example, processor 105 may increase the frame rate, decrease the frame rate, or leave the frame rate of DVS 150 unchanged based upon the inertial data generated by IMU 155. As an illustrative and non-limiting example, in response to processor 105 detecting increased motion over time based upon the inertial data, processor 105 is capable of controlling DVS 150 to increase the frame rate of DVS 150. In response to detecting reduced motion over time based upon the inertial data, processor 105 is capable of controlling DVS 150 to decrease the frame rate of DVS 150. In response to detecting that motion is relatively constant or unchanged, e.g., within established ranges, based upon the inertial data, processor 105 is capable of leaving the frame rate of DVS 150 unchanged.

By controlling the frame rate of DVS 150 as described, system 100 is capable of varying the amount of power consumed. System 100 is able to use a dynamic (e.g., variable) frame rate for DVS 150 to reduce the computational workload performed by system 100 compared to other systems that utilize RGB fixed frame rate processing thereby reducing power consumption. Thus, in cases where relatively low motion is detected, system 100 is able to reduce power consumption by way of a lower frame rate for DVS 150.

Returning to the data structures stored in memory 110, 3D map 125 may be implemented as a database or other data structure that specifies a 3D map of a known 3D environment in which camera pose is to be determined and/or tracked. In particular embodiments, 3D map 125 includes a plurality of keyframes. Each keyframe may be an RGB image. The keyframes are 2D. The keyframes of 3D map 125 have overlapping fields of view. Each keyframe within 3D map 125 may also be associated with a camera pose (e.g., a 3D with 6 degrees of freedom) for the known 3D environment from which the RGB image was obtained. In particular embodiments, for each of the keyframes, only the depth of a sparse set of keypoints of the keyframe is known. 3D map 125 may also include a point cloud of the known 3D environment.

In particular embodiments, 3D map 125 includes metadata. Examples of metadata that may be included within 3D map 125 include, but are not limited to, location data obtained from a GPS receiver.

In one or more embodiments, system 100 begins operation with 3D map 125 prebuilt. For example, 3D map 125 may be built using an offline process, whether performed by system 100 or another data processing system and made available to system 100. In one aspect, system 100 is capable of using RGB sensor 145 to collect RGB images and/or video that may be processed using a structure from motion image processing technique to generate 3D map 125. Structure from motion is a photogrammetric range imaging technique for estimating 3D structures from 2D image sequences that may be coupled with local motion signals. In another aspect, a different system may use RGB images and/or video obtained from RGB sensor 145 and/or another RGB sensor and apply structure from motion image processing to generate 3D map 125. Whether system 100 or another data processing system is used, such system may receive GPS data and incorporate the GPS data within 3D map 125 as metadata.

In particular embodiments, system 100 is capable of synthesizing DVS images for keyframes of 3D map 125. System 100 is capable of incorporating information from edges detected in the keyframe (e.g., RGB image) and the estimated velocity of the RGB sensor at the time that the keyframe was captured. Estimated velocity may be determined from inertial data obtained concurrently with capture of the keyframe. Edges may be detected from keyframes using an edge detection technique. As such, one or more or all of the keyframes of 3D map 125 may be associated with a corresponding synthesized DVS image. By including synthesized DVS images within 3D map 125 in association with the keyframes, system 100 capable of more accurately comparing DVS images captured using DVS 150 with 3D map 125 for purposes of camera pose tracking during operation.

In general, 3D map 125 provides an efficient way of storing the geometry of a known 3D environment or scene. 3D map 125 facilitates a direct comparison between the keyframes contained therein and DVS images obtained from DVS 150 for the known 3D environment to facilitate pose tracking within that 3D environment. Because 3D map 125 is computed offline, 3D map 125 may be stored and re-used. System 100, for example, does not need to compute 3D map 125 each time system 100 is turned on or activated so long as system 100 is utilized in the same known 3D environment and such environment remains relatively unchanged.

The re-localization model may be built from 3D map 125. Re-localization data 130, for example, may be implemented as a database or other data structure that specifies parameters for re-localization program 135 determined through a training process. A learning module may be used to process 3D map 125 to generate re-localization data 130. In one or more embodiments, re-localization program 135 may be implemented as one or more classifiers that are capable of recognizing particular objects within images. The learning module is capable of training the classifiers to recognize particular objects of interest from within the known 3D environment. The parameters determined from the training process may be stored as re-localization data 130. As such, re-localization program 135 is capable of processing received RGB images to recognize objects of interest included therein using the parameters for the classifiers obtained from re-localization data 130. Thus, whereas 3D map 125 provides a 3D representation of an entire known 3D environment, the re-localization model is capable of recognizing particular objects of interest within that known 3D environment and determining camera pose based upon detecting such objects.

As an illustrative and non-limiting example, consider the case where the known 3D environment is an entire floor, e.g., the $3^{rd}$ floor, of a multi-story building. 3D map 125 specifies a 3D map of the entire $3^{rd}$ floor of that building. By comparison, re-localization data 130 and re-localization program 135 are capable of recognizing particular objects of interest in 2D images of the 3D environment. For example, RGB images of the $3^{rd}$ floor may be taken by RGB sensor 145 and fed to re-localization program 135. Re-localization program 135 may process the RGB images using parameters from re-localization data 130 to detect objects of interest such as a particular piece of furniture (e.g., conference table or a chair) or a particular architectural feature within the RGB images. Different classifiers may be capable of recognizing different types of tables, different types of chairs, architectural features, or other objects having known locations and orientations within the known 3D environment. Having recognized particular objects of the known 3D environment within the received RGB images, the system has an indication of where within the 3D environment the 2D image corresponds and is capable of determining an initial camera pose for RGB sensor 145 within the known 3D environment.

Tracking program 120 is capable of performing several different operations. In one aspect, tracking program 120 is capable of determining a prior camera pose based upon received RGB images and optionally DVS images while using re-localization data 130 and re-localization program 135. In another aspect, once an initial camera pose is determined, tracking program 120 is capable of continuing to track camera pose based upon DVS images and 3D map 125. For purposes of discussion, the initial camera pose is used as the "prior camera pose" during tracking at least after startup and/or recovery from an error condition.

System 100 may optionally include one or more other I/O devices 165 coupled to interface circuitry 115. I/O devices 165 may be coupled to system 100, e.g., interface circuitry 115, either directly or through intervening I/O controllers. Examples of I/O devices 165 include, but are not limited to, a keyboard, a display device, a pointing device, one or more communication ports, and a network adapter. A network adapter refers to circuitry that enables system 100 to become coupled to other systems, computer systems, remote printers, and/or remote storage devices through intervening private or public networks. Modems, cable modems, Ethernet cards, and wireless transceivers are examples of different types of network adapters that may be used with system 100.

System 100 may include fewer components than shown or additional components not illustrated in FIG. 1 depending upon the particular type of device and/or system that is implemented. In addition, the particular operating system, application(s), and/or I/O devices included may vary based upon system type. Further, one or more of the illustrative components may be incorporated into, or otherwise form a portion of, another component. For example, a processor may include at least some memory. System 100 may be used to implement a single computer or a plurality of networked or interconnected computers each implemented using the architecture of FIG. 1 or an architecture similar thereto.

In one or more embodiments, system 100 may be implemented as a standalone device. The device may be coupled, attached, and/or communicatively linked to another existing device such as a mobile phone, a gaming system, a wearable device, a virtual or augmented reality headset, or a vehicle to provide camera pose information to the device. Camera pose information may be provided to other components (not shown) that may be coupled to interface circuitry 115 and/or provided to other systems via I/O device(s) 165.

In one or more other embodiments, system 100 may be implemented so that sensor assembly 140 is coupled or attached to another existing device. For example, sensor assembly 140 may be coupled or attached to another existing device such as a mobile phone, a gaming system, a wearable device, a virtual or augmented reality headset, or a vehicle. In that case, processor 105, memory 110, and/or interface circuitry 115 are implemented within the device to which sensor assembly 140 is attached, coupled, or communicatively linked.

The different applications and configurations of system 100 described within this disclosure are provided for purposes of illustration and not limitation. System 100 and/or various aspects thereof may be utilized in any of a variety of different applications where camera pose may be used. Such applications may include, but are not limited to, automotive applications (e.g., autonomous and/or assisted driving), robotics, and computer vision (e.g., augmented reality and/or virtual reality). The embodiments described herein may be particularly suited to applications that operate in low-light conditions due to the high update rate of DVS 150 and the ability of DVS 150 to operate in low-light conditions.

Figure 2:
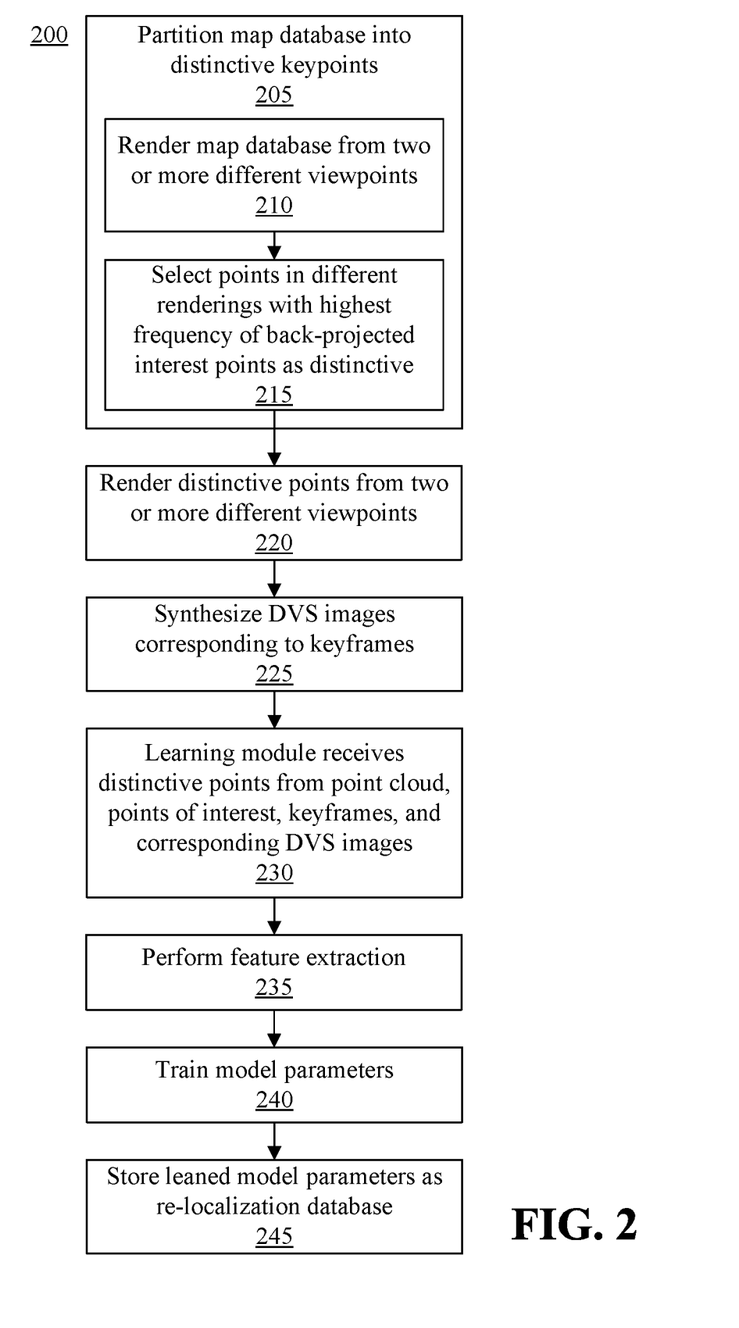
FIG. 2 illustrates an example method of generating a re-localization model.

FIG. 2 illustrates an example method 200 of generating re-localization data. Method 200 may be performed using the system described in connection with FIG. 1 or another data processing system. In general, re-localization program 135 may be implemented based upon a machine learning classification model. The machine learning classification model may be trained to find correspondences between interest points in a received, or current, 2D RGB image and 3D points from 3D map 125.

In block 205, the system is capable of partitioning the 3D map into a set of distinctive keypoints. For example, in block 210, the system renders the 3D map from two or more different viewpoints to generate, or render, 2D images. The number of rendered 2D images may be large enough to cover the entire 3D map. The number of viewpoints used may be a configurable (e.g., an adjustable) parameter. In block 215, the system is capable of back-projecting points of interest found in the rendered 2D images to the point cloud. The system selects points from the point cloud with the highest frequency of back-projected interest points as distinctive. In an example, the points with the highest frequency may be any points with a frequency above a threshold frequency. In another example, the points with the highest frequency may be any points with a frequency within the "N" highest frequencies where N is an integer value. In another example, the points with the highest frequency may be any points with a frequency in a top, specified percentage of the frequencies.

In block 220, the system renders the distinctive points of the point cloud from two or more different viewpoints as 2D images (e.g., RGB images). For example, the system is capable of choosing a variety of viewpoints in the 3D map that are diverse and numerous. The system further is capable of using the 3D map and the camera pose to render 2D images containing the distinctive points using available computer graphics techniques. In block 225, the system optionally synthesizes DVS images from the rendered 2D images containing the distinctive points to increase matching robustness of high contrast scenes.

In block 230, the machine learning module receives the distinctive points from the point cloud, the rendered 2D images containing the distinctive points, the 3D map (e.g., the keyframes), and optionally the corresponding and synthesized DVS images. In block 235, the learning module performs feature extraction. In block 240, the learning module trains the model parameters (e.g., the parameters of the classifiers). In block 245, the system saves the resulting parameters as the re-localization data.

Subsequent to training, once the model parameters are determined, the system is capable of using the re-localization model to determine a sufficient, e.g., a minimum, number of correspondences between points in received RGB images and 3D map 125 (e.g., the point cloud of 3D map 125). The system may then use available image processing techniques to determine an initial camera pose given the correspondences between points in the RGB image and 3D map 125.

Figure 3:
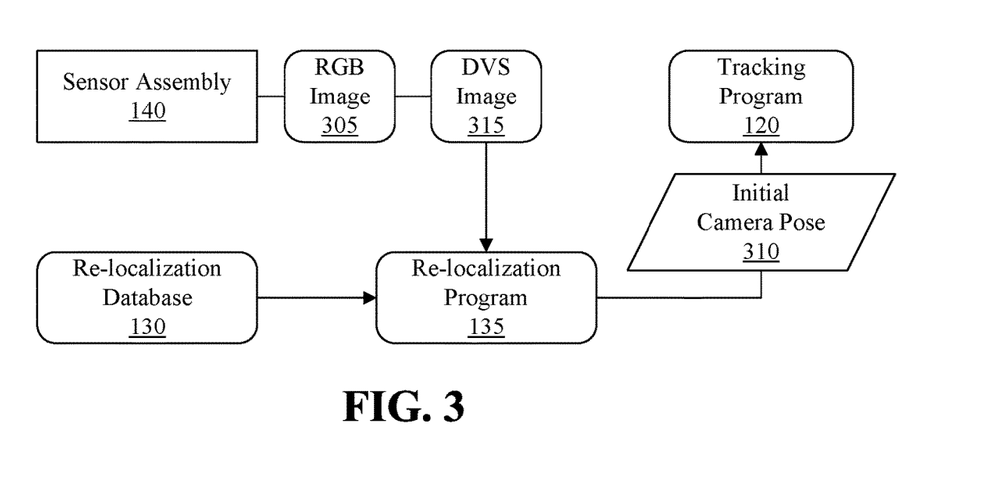
FIG. 3 illustrates an example of determining an initial camera pose within a known 3-dimensional (3D) environment.

FIG. 3 illustrates an example of determining an initial camera pose within a known 3D environment. The operations described in connection with FIG. 3 may be performed by a system as described in connection with FIG. 1. FIG. 3 illustrates an example of a startup process that may be performed by the system. The process illustrated in FIG. 3 may also be performed by the system as a recovery process in response to an error condition.

As pictured, sensor assembly 140 is capable of providing RGB image 305 to re-localization program 135. In one or more embodiments, sensor assembly 140 may provide RGB image 305 and DVS image 315 to re-localization program 135. In the case where both RGB image 305 and DVS image 315 are provided, the two images may be taken at the same time or at substantially the same time. As discussed, RGB sensor 145 and DVS 150 may have overlapping fields of view. As such, RGB image 305 and the DVS image 315 may be of substantially the same portion of the known 3D environment. Re-localization program 135 is capable of processing RGB image 305 and optionally DVS image 315 using parameters obtained from re-localization data 130 to determine an initial camera pose 310 for RGB sensor 145 (or for sensor assembly 140). As noted, initial camera pose 310 may be used as a prior camera pose for purposes of tracking camera pose as described in greater detail with reference to FIG. 5.

Figure 4:
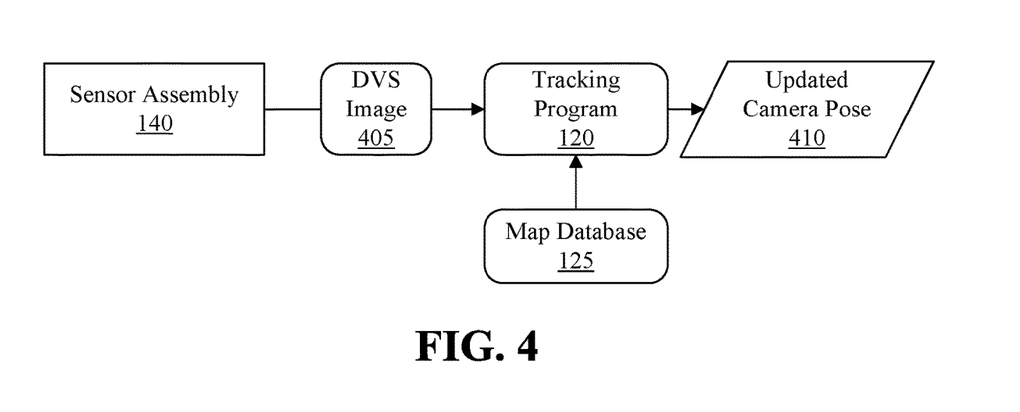
FIG. 4 illustrates an example of tracking camera pose within a known 3D environment.

FIG. 4 illustrates an example of tracking camera pose within a known 3D environment. The operations described in connection with FIG. 4 may be performed by a system as described in connection with FIG. 1. FIG. 4 illustrates an example of a process that may be performed by the system subsequent to performing the startup process and/or the recovery process.

As pictured, sensor assembly 140 is capable of providing DVS image 405 to tracking program 120. In another aspect, sensor assembly 140 may also provide inertial data and/or GPS data to tracking program 120 with DVS image 405. In the example of FIG. 4, once initial camera pose 310 is determined through either a startup process or a recovery process, processor 105 is capable of deactivating, or turning off, RGB sensor 145. As such, DVS image 405 does not include RGB data (any RGB images). Tracking program 120 is capable of comparing DVS image 405 with 3D map 125 to determine a current camera pose 410 based upon initial (or prior) camera pose 310. Appreciably, as the system continues to operate, tracking program 120 utilizes current camera pose 410 as the prior camera pose for processing a next DVS image using 3D map 125.

As discussed, DVS 150 is capable of operating at a higher rate than RGB sensor 145. Despite the ability to operate at a higher rate to provide reduced latency, the data throughput of DVS 150 is smaller compared to traditional low-power camera sensors (e.g., RGB sensor 145). As such, system 100 is capable of accurately tracking camera pose with reduced latency compared to conventional systems while also operating with increased computational efficiency due, at least in part, to the lower data throughput of DVS 150.

Figure 5:
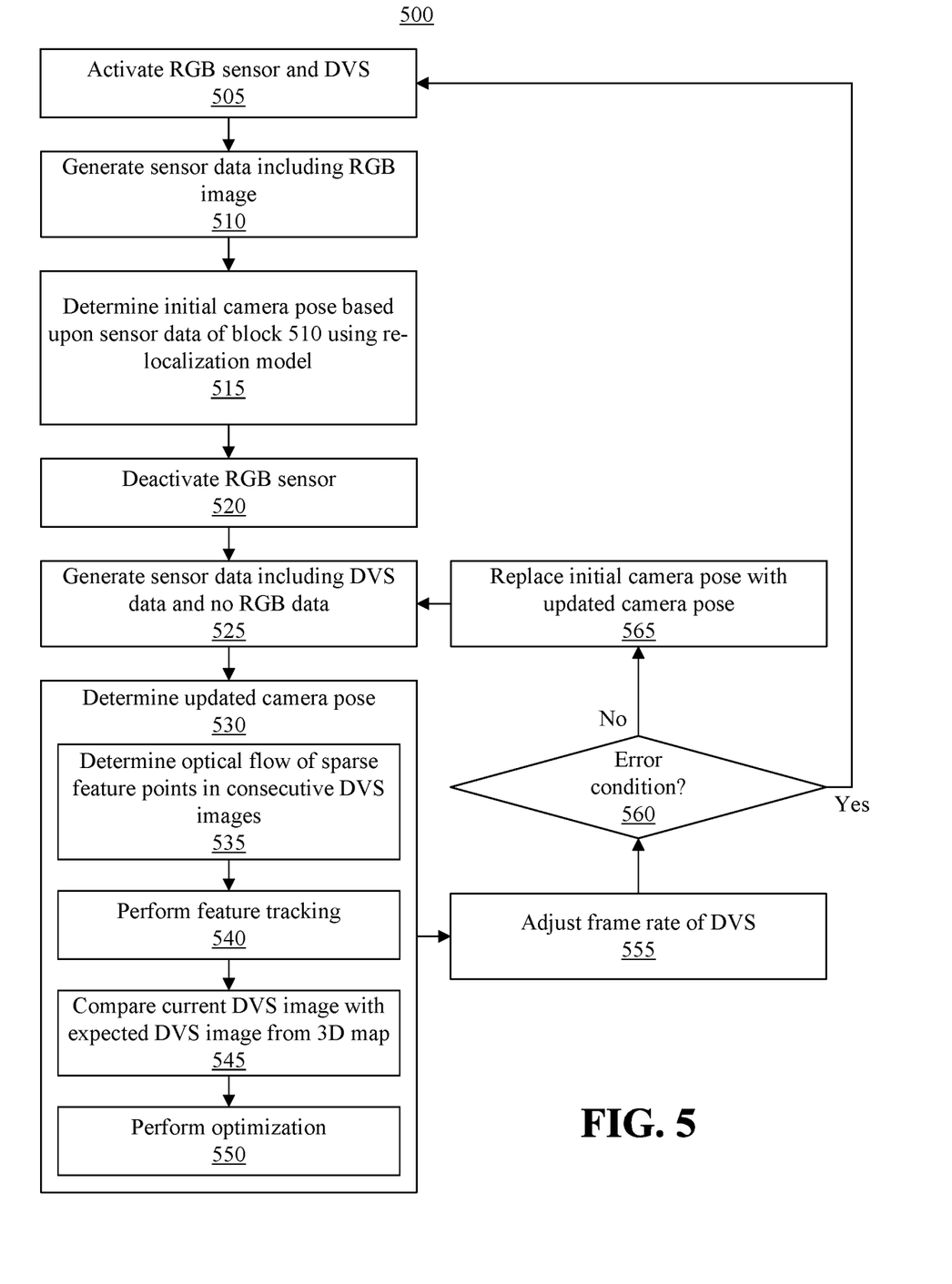
FIG. 5 illustrates an example method of determining and tracking camera pose within a known 3D environment.

FIG. 5 illustrates an example method 500 of determining and tracking camera pose within a known 3D environment. The operations described in connection with FIG. 5 may be performed by a system as described in connection with FIG. 1. The operations of FIG. 5 may be performed in real time. Method 500 may begin in a state where 3D map 125, re-localization data 130, and re-localization program 135 have been implemented for the known 3D environment and are available for use by the system.

Beginning in block 505 and continuing through block 520, the system performs a startup process. Because the system is initialized using the re-localization model, the system is capable of launching and beginning operation near instantaneously. By comparison, other conventional systems, e.g., monocular SLAM (Simultaneous Localization and Mapping) systems, that create a map and track the camera pose simultaneously not only require higher computational resources, but also require user cooperation for initialization thereby causing a startup delay.

As discussed, the startup process may also be used as a recovery process. In general, the startup and/or recovery process involves usage of the RGB sensor to determine an initial camera pose for the system that is used as the prior camera pose during tracking. Accordingly, in block 505, the system is capable of activating the RGB sensor if not already activated. The system is further capable of activating the DVS if not already activated and if the DVS is to be used for startup and/or recovery. The system may also activate other sensors such as the IMU and/or the GPS if not already activated.

In block 510, the system generates sensor data. For example, the sensor(s) of the multi-sensor assembly are capable of generating the sensor data. The sensor data may include an RGB image captured from the RGB sensor. The sensor data may optionally include a DVS image generated by the DVS. The RGB sensor and the DVS, for example, may be calibrated to work in a coordinated manner so that the RGB image and the DVS image are generated at or about the same time by each respective sensor and for a same or substantially similar field of view within the known 3D environment. As discussed, the field of view of the RGB sensor may overlap the field of view of the DVS.

In one or more embodiments, the sensor data generated in block 510 may include additional sensor data. For example, the sensor data generated in block 510 may include inertial data that is measured at or about the same time that the RGB image and/or DVS image is obtained. In another example, the sensor data generated in block 510 may include GPS data that is obtained at or about the same time that RGB image and/or DVS image is obtained.

In block 515, the system is capable of determining an initial camera pose based upon the sensor data of block 510 using the re-localization program and the re-localization data. The re-localization program is capable of determining the initial camera pose using available camera pose determination techniques. For example, the system is capable of detecting objects of interest within the RGB and/or DVS image using the re-localization model. Since the re-localization model maps features of interest to points with the 3D map, the system is able to determine the initial camera pose based upon the identified objects of interest from the received image(s). In block 520, in response to determining an initial camera pose in block 515, the system is capable of deactivating the RGB sensor.

The startup process described in connection with blocks 505-520 effectively initializes the system with the initial camera pose. Due to the use of the re-localization data and re-localization program as described, the startup process has little or no startup delay since a map need not be generated at startup. Further, the startup process may be performed automatically, e.g., without user cooperation or intervention.

Beginning in block 525 and continuing through block 560, the system performs a tracking process. In general, the tracking process involves usage of the DVS since the RGB sensor is deactivated. The tracking process may also utilize additional sensors such as, for example, the IMU and/or the GPS receiver.

Accordingly, in block 525, the system is capable of generating sensor data. The sensor data generated in block 525 does not include any RGB images as the RGB sensor is deactivated. In block 525, for example, the DVS is capable of generating a DVS image. As discussed, the DVS image may be output directly from the DVS or composed by a processor coupled to the DVS. In any case, the DVS image is an image of the known 3D environment or a portion thereof.

In one or more embodiments, the sensor data generated in block 525 may include additional sensor data. For example, the sensor data generated in block 525 may include inertial data that is generated by the IMU at or about the same time that the DVS image is generated. In another example, the sensor data generated in block 525 may include GPS data that is generated by the GPS receiver at or about the same time that the DVS image is generated.

In block 530, the system is capable of tracking the camera pose to determine a current camera pose. In block 530, for example, given a prior camera pose, the system is capable of determining a current camera pose. The system may determine the current camera pose using the sensor data from block 525, the 3D map, and the prior camera pose. As noted, the initial camera pose determined in block 515 may be used as the prior camera pose for purposes of tracking at least during the first iteration of tracking following startup and/or recovery. The current camera pose may be a camera pose that is calculated as being the most likely camera pose to explain the sensor measurements, e.g., from the DVS and the IMU.

In one or more embodiments, the tracking program, as executed by the system, is capable of using complementary sources of information to determine the current camera pose. The complementary sources of information may include a calculated optical flow using DVS images, expected DVS images from the 3D map given a current DVS image, and inertial data. The system is capable of using a non-linear optimization technique that utilizes the complementary data described to estimate camera pose.

In block 535, the system is capable of calculating the optical flow of sparse feature points between consecutive or neighboring DVS images in time. The system, for example, is capable of performing optical flow between a current DVS image and a prior DVS image that may be received as part of a time sequence of DVS images from the DVS. In block 540, the system is capable of performing feature tracking. The system may perform feature tracking to determine the change in location of a feature or features found within a prior DVS image to the location of such feature(s) within the current DVS image (e.g., the next DVS image in time).

In block 545, the system is capable of comparing the current DVS image to the DVS image that is expected from the 3D map. The system is capable of retrieving a small subset of keyframes from the 3D map. Since the system has the initial or prior camera pose, the system is capable of retrieving one or more keyframes from the 3D map that have the prior camera pose or that are within a predetermined amount or measure of the prior camera pose. The system, for example, may retrieve the keyframes from the 3D map on either side of the prior camera pose as such keyframes will have camera poses with similar position and orientation as the prior camera pose. Using the retrieved keyframes, the system is capable of synthesizing frames from different viewpoints based upon the inertial data. The system attempts to match the current DVS image with the synthesized frames to determine a match.

In block 550, the system is capable of performing an optimization operation to determine the current camera pose. The system, for example, is capable of minimizing the pixel intensity error between the synthesized frame(s) calculated from the retrieved keyframes and the current DVS image. The system may also minimize other error terms derived from the inertial data and the DVS feature tracks from the optical flow. For example, the system may minimize reprojection error which measures how well the feature tracks from the optical flow match the camera motion. The system may also minimize IMU residual error which measures how well the inertial data from the IMU matches the predicted camera motion.

In one or more embodiments, where a stereo DVS configuration is used, one of the error terms may be a depth comparison from the stereo DVS. This process effectively fuses the complementary information sources. The objective function solved by the system is highly non-convex, thereby requiring a close initialization. The prior camera pose may provide this initialization. The system determines a current camera pose as the result from the optimization described.

Block 530 illustrates that the current DVS images generated by the system are tracked with respect to the 3D map, which is a global map of the known 3D environment. By tracking the current DVS images relative to the 3D map, the system avoids the accumulation of small tracking errors, referred to as camera pose drift, that may occur over time that are found in other conventional systems that utilize Visual Odometry (VO), for example.

In block 555, the system may optionally adjust the frame rate of the DVS automatically based upon the inertial data as previously described.

In block 560, the system determines whether an error condition has been detected. For example, in some cases, the system may fail to converge to a global minimum. In such cases, the system returns an erroneous pose as the current camera pose. In particular embodiments, the system is capable of detecting the error condition based upon the value of the objective function after the optimization of block 550. For example, the system may use a threshold value to evaluate the objective function. In cases where the value of the objective function exceeds the threshold value, the system determines that an error condition has occurred. In such cases, the value of the objective function is indicative that the camera motion predicted by the system does not match the real-world motion of the camera. If an error condition is detected, method 500 may loop back to block 505 to perform a recovery process where the prior (initial) camera pose is again determined using the RGB sensor. If an error condition is not detected, method 500 may continue to block 565.

In block 565, the system is capable of replacing the prior camera pose with the current camera pose determined in block 530. Accordingly, during the next iteration through the tracking process, the next current camera pose is determined based upon the current camera pose from block 530 of the prior iteration of the tracking process. After block 565, method 500 loops back to block 525 to continue the tracking process.

In one or more embodiments, the 3D map may be updated over time. For example, in cases where new construction is performed in the 3D environment or an object within the 3D environment is moved, the 3D map may be updated automatically by the system. As an illustrative and non-limiting example, the system may detect a discrepancy between the 3D map and a current image, whether a DVS image or an RGB image. In response to detecting a discrepancy, the system may initiate a 3D map generation process automatically and save the newly generated 3D map for use in performing camera pose tracking within the changed 3D environment.

The terminology used herein is for the purpose of describing particular embodiments only and is not intended to be limiting. Notwithstanding, several definitions that apply throughout this document now will be presented.

As defined herein, the singular forms "a," "an," and "the" are intended to include the plural forms as well, unless the context clearly indicates otherwise.

The term "approximately" means nearly correct or exact, close in value or amount but not precise. For example, the term "approximately" may mean that the recited characteristic, parameter, or value is within a predetermined amount of the exact characteristic, parameter, or value.

As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without user intervention.

As defined herein, the term "computer readable storage medium" means a storage medium that contains or stores program code for use by or in connection with an instruction execution system, apparatus, or device. As defined herein, a "computer readable storage medium" is not a transitory, propagating signal per se. A computer readable storage medium may be, but is not limited to, an electronic storage device, a magnetic storage device, an optical storage device, an electromagnetic storage device, a semiconductor storage device, or any suitable combination of the foregoing. The different types of memory, as described herein, are examples of a computer readable storage media. A non-exhaustive list of more specific examples of a computer readable storage medium may include: a portable computer diskette, a hard disk, a random-access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, or the like.

As defined herein, the term "responsive to" means responding or reacting readily to an action or event. Thus, if a second action is performed "responsive to" a first action, there is a causal relationship between an occurrence of the first action and an occurrence of the second action. The term "responsive to" indicates the causal relationship.

The term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

As defined herein, the terms "one embodiment," "an embodiment," "one or more embodiments," or similar language mean that a particular feature, structure, or characteristic described in connection with the embodiment is included in at least one embodiment described within this disclosure. Thus, appearances of the phrases "in one embodiment," "in an embodiment," "in one or more embodiments," and similar language throughout this disclosure may, but do not necessarily, all refer to the same embodiment. The terms "embodiment" and "arrangement" are used interchangeably within this disclosure.

As defined herein, the term "output" means storing in physical memory elements, e.g., devices, writing to a display or other peripheral output device, sending or transmitting to another system, exporting, or the like.

As defined herein, the term "processor" means at least one hardware circuit. The hardware circuit may be configured to carry out instructions contained in program code. The hardware circuit may be an integrated circuit. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "real-time" means a level of processing responsiveness that a user or system senses as sufficiently immediate for a particular process or determination to be made, or that enables the processor to keep up with some external process.

As defined herein, the term "user" means a human being.

The terms first, second, etc. may be used herein to describe various elements. These elements should not be limited by these terms, as these terms are only used to distinguish one element from another unless stated otherwise or the context clearly indicates otherwise.

A computer program product may include a computer readable storage medium (or media) having computer readable program instructions thereon for causing a processor to carry out aspects of the present invention. Within this disclosure, the term "program code" is used interchangeably with the term "computer readable program instructions." Computer readable program instructions described herein may be downloaded to respective computing/processing devices from a computer readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations for the inventive arrangements described herein may be assembler instructions, instruction-set-architecture (ISA) instructions, machine instructions, machine dependent instructions, microcode, firmware instructions, or either source code or object code written in any combination of one or more programming languages, including an object-oriented programming language and/or procedural programming languages. Computer readable program instructions may specify state-setting data. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer readable program instructions by utilizing state information of the computer readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer readable program instructions, e.g., program code.

These computer readable program instructions may be provided to a processor of a computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. In this way, operatively coupling the processor to program code instructions transforms the machine of the processor into a special-purpose machine for carrying out the instructions of the program code. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the inventive arrangements. In this regard, each block in the flowcharts or block diagrams may represent a module, segment, or portion of instructions, which comprises one or more executable instructions for implementing the specified operations. In some alternative implementations, the operations noted in the blocks may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts or carry out combinations of special purpose hardware and computer instructions.

The corresponding structures, materials, acts, and equivalents of all means or step plus function elements that may be found in the claims below are intended to include any structure, material, or act for performing the function in combination with other claimed elements as specifically claimed.

The description of the embodiments provided herein is for purposes of illustration and is not intended to be exhaustive or limited to the form and examples disclosed. The terminology used herein was chosen to explain the principles of the inventive arrangements, the practical application or technical improvement over technologies found in the marketplace, and/or to enable others of ordinary skill in the art to understand the embodiments disclosed herein. Modifications and variations may be apparent to those of ordinary skill in the art without departing from the scope and spirit of the described inventive arrangements. Accordingly, reference should be made to the following claims, rather than to the foregoing disclosure, as indicating the scope of such features and implementations.

What is claimed is:

1. A system, comprising:
    a dynamic vision sensor (DVS) configured to generate a current DVS image;
    an inertial measurement unit (IMU) configured to generate inertial data;
    a memory configured to store a 3-dimensional (3D) map of a known 3D environment; and
    a processor coupled to the memory, wherein the processor is configured to initiate operations including determining a current camera pose for the DVS based on the current DVS image, the inertial data, the 3D map, and a prior camera pose;
    wherein the determining the current camera pose includes:
        determining motion by performing optical flow of sparse feature points in a plurality of consecutive DVS images including the current DVS image;
        tracking features within the plurality of consecutive DVS images; and
        comparing the current DVS image with a synthesized DVS image generated based on the 3D map;
        wherein the current camera pose is determined based on the motion, the tracked features, and the comparing of the current DVS image with the synthesized DVS image.

2. The system of claim 1, wherein the processor is configured to initiate operations further comprising:
    adjusting a DVS frame rate corresponding to the DVS based upon the inertial data.

3. The system of claim 1, wherein the 3D map includes a 3D point cloud and keyframes with corresponding camera poses, wherein the keyframes are Red, Green, and Blue (RGB) keyframes with overlapping fields of view.

4. The system of claim 3, wherein the comparing the current DVS image with the synthesized DVS image comprises:
    selecting a keyframe from the 3D map based on the prior camera pose; and
    generating the synthesized DVS image based on the selected keyframe and the inertial data.

5. The system of claim 4, wherein the determining the current camera pose comprises performing an optimization to minimize pixel intensity error between the synthesized DVS image and the current DVS image.

6. The system of claim 3, further comprising an RGB sensor configured to generate an RGB image, wherein the processor is configured to initiate operations further comprising:
    determining the prior camera pose using a learned re-localization model, wherein the learned re-localization model maps points in the RGB image to corresponding points in the 3D map.

7. The system of claim 6, wherein the processor is configured to initiate operations further comprising:
    deactivating the RGB sensor in response to calculating the prior camera pose.

8. The system of claim 1, further comprising:
    a Global Positioning System (GPS) receiver configured to generate GPS data, wherein the current camera pose is determined based, at least in part, on the GPS data.

9. A method, comprising:
    generating, using a dynamic vision sensor (DVS), a current DVS image;
    generating, using an inertial measurement unit (IMU), inertial data;
    retrieving, using a processor, at least a portion of a 3-dimensional (3D) map of a known 3D environment from a memory; and
    determining, using the processor, a current camera pose for the DVS based on the current DVS image, the inertial data, the 3D map, and a prior camera pose, wherein the determining the current camera pose includes:
        determining motion by performing optical flow of sparse feature points in a plurality of consecutive DVS images including the current DVS image;
        tracking features within the plurality of consecutive DVS images; and
        comparing the current DVS image with a synthesized DVS image generated based on the 3D map;
        wherein the current camera pose is determined based on the motion, the tracked features, and the comparing of the current DVS image with the synthesized DVS image.

10. The method of claim 9, further comprising:
    adjusting a DVS frame rate corresponding to the DVS based upon the inertial data.

11. The method of claim 9, wherein the 3D map includes a 3D point cloud and keyframes with corresponding camera poses, wherein the keyframes are Red, Green, and Blue (RGB) keyframes with overlapping fields of view.

12. The method of claim 11, wherein the comparing the current DVS image with the synthesized DVS image comprises:
selecting a keyframe from the 3D map based on the prior camera pose; and
generating the synthesized DVS image based on the selected keyframe and the inertial data.

13. The method of claim 12, wherein the determining the current camera pose comprises performing an optimization to minimize pixel intensity error between the synthesized DVS image and the current DVS image.

14. The method of claim 11, further comprising:
generating, using an RGB sensor, an RGB image; and
determining the prior camera pose using a learned re-localization model, wherein the learned re-localization model maps points in the RGB image to corresponding points in the 3D map.

15. The method of claim 14, further comprising:
deactivating the RGB sensor in response to calculating the prior camera pose.

16. The method of claim 9, further comprising:
generating, using a Global Positioning Sensor (GPS), GPS data, wherein the current camera pose is determined based on the GPS data.

17. A computer program product, comprising:
a computer readable storage medium having program code stored thereon, the program code executable by computer hardware to initiate operations including:
generating a current Dynamic Vision Sensor (DVS) image;
generating inertial data;
retrieving at least a portion of a 3-dimensional (3D) map of a known 3D environment from a memory; and
determining a current camera pose for the DVS based on the current DVS image, the inertial data, the 3D map, and a prior camera pose, wherein the determining the current camera pose includes:
determining motion by performing optical flow of sparse feature points in a plurality of consecutive DVS images including the current DVS image;
tracking features within the plurality of consecutive DVS images; and
comparing the current DVS image with a synthesized DVS image generated based on the 3D map;
wherein the current camera pose is determined based on the motion, the tracked features, and the comparing of the current DVS image with the synthesized DVS image.

18. The computer program product of claim 17, further comprising:
adjusting a DVS frame rate corresponding to the DVS based upon the inertial data.

19. The computer program product of claim 17, wherein the 3D map includes a 3D point cloud and keyframes with corresponding camera poses, wherein the keyframes are Red, Green, and Blue (RGB) keyframes with overlapping fields of view.

20. The computer program product of claim 19, wherein the comparing the current DVS image with the synthesized DVS image comprises:
selecting a keyframe from the 3D map based on the prior camera pose; and
generating the synthesized DVS image based on the selected keyframe and the inertial data.

21. The computer program product of claim 20, wherein the determining the current camera pose comprises performing an optimization to minimize pixel intensity error between the synthesized DVS image and the current DVS image.

22. The computer program product of claim 19, further comprising:
generating an RGB image using an RGB sensor; and
determining the prior camera pose using a learned re-localization model, wherein the learned re-localization model maps points in the RGB image to corresponding points in the 3D map.

23. The computer program product of claim 22, further comprising:
deactivating the RGB sensor in response to calculating the prior camera pose.

24. The computer program product of claim 17, further comprising:
generating, using a Global Positioning Sensor (GPS), GPS data, wherein the current camera pose is determined based on the GPS data.

* * * * *